(12) United States Patent
Vehe

(10) Patent No.: US 6,775,978 B1
(45) Date of Patent: Aug. 17, 2004

(54) CAGING ARRANGEMENT FOR A CENTER PORT COMPENSATION VALVE

(75) Inventor: Daniel John Vehe, LaGrange, IL (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/373,294

(22) Filed: Feb. 24, 2003

(51) Int. Cl.$^7$ ............................................. B60T 11/20
(52) U.S. Cl. ........................................ 60/562; 60/589
(58) Field of Search ................................... 60/562, 589

(56) References Cited

U.S. PATENT DOCUMENTS

| | | | | |
|---|---|---|---|---|
| 4,621,498 A | * | 11/1986 | Schaefer | 60/562 |
| 4,771,605 A | * | 9/1988 | Kytta | 60/562 |
| 5,042,254 A | * | 8/1991 | Schonlau et al. | 60/562 |
| 6,402,263 B1 | * | 6/2002 | Wasson | 60/562 |

* cited by examiner

*Primary Examiner*—Edward K. Look
*Assistant Examiner*—Igor Kershteyn
(74) *Attorney, Agent, or Firm*—Leo H. McCormick, Jr.; Warren Comstock

(57) ABSTRACT

A brake system having a master cylinder with a center port compensation valve wherein a head on a stem for caging a return spring moves within a poppet assembly as a direct function of the compression of the return spring during the development of pressurized fluid that is supplied to wheel brake to effect a brake application.

9 Claims, 2 Drawing Sheets

CAGING ARRANGEMENT FOR A CENTER PORT COMPENSATION VALVE

This invention relates to a caging arrangement for a center port valve located in a bore of a master cylinder to control communication between the bore and a reservoir.

BACKGROUND OF THE INVENTION

U.S. Pat. Nos. 5,018,353 and 5,111,661 disclose master cylinders wherein compensation between a first chamber in a bore of a housing and a reservoir occurs through a single center port compensation valve associate with a first piston and between a second chamber in the bore through a relationship established between a radial port and sealing structure carried on a second piston. In order to eliminate the possibility of cutting a nub in a seal by extrusion into the radial port, U.S. Pat. Nos. 5,207,062; 5,279,125 and 5,943,863 disclose the use of a second center port compensation valve through which compensation is achieved for the second operational chamber in a bore. Most such master cylinders have a separate compensation valve for the first and second pressurizing chambers in the bore through which communication typically occurs through ports when the first and second pistons are in a rest position. As the first and second pistons approach the rest position, a stop pin engages the compensation valve to open the compensation valve and initiate communication between the bore and reservoir. Unfortunately, the passage required to connect the rear chamber is quite long as the compensation port needs to be located adjacent the end of the housing of the master cylinder. In addition, when such master cylinders are recessed into a front chamber of a vacuum brake booster care needs to be taken with respect to sealing structure to assure that vacuum does not draw fluid into the vacuum brake booster. While this type master cylinder functions in an adequate manner under some circumstances, the fluid pressure generated during a brake application may extrude a portion of a poppet into a compensation port leading to a reservoir and as a result it may be possible to cut the face on the poppet to an extent that a leak may develop between the bore and the reservoir during a brake application. The invention in U.S. patent application Ser. No. 10/246,101 filed Sep. 18, 2002, discloses structure for reducing the possibility of damage to a face seal of a poppet, however, in many master cylinders that have center port compensation valves the process of bleeding air from a brake system can present a challenge when caging pins for the return spring move within a blind passage of a piston and as a result care must be taken to assure that the system is completely filled with fluid.

SUMMARY OF THE INVENTION

A primary object of the present invention is to provide a brake system having a master cylinder with a center port compensation valve wherein a head on a stem for caging a return spring moves within a poppet assembly as a direct function of the compression of the return spring during the development of pressurized fluid that is supplied to wheel brake to effect a brake application.

According to this invention, the master cylinder has a housing with a bore that is connected through axial port in the bottom of the bore and a radial port with a reservoir and to the brake system through first and second outlet ports. First and second pistons are positioned in the bore by a first resilient means located between the first and second pistons to define limits for a first chamber and by a second resilient means located between the second piston and the bottom of the bore to define limits for a second chamber. The first and second resilient means each include a return spring and a poppet spring with the first return spring caged between a retainer and a piston while the poppet spring is caged between the retainer and a poppet included in a center port compensation valve. The poppet is defined by a cylindrical member with an axial bore that extends from a first end to a second end. The axial bore has an annular shoulder adjacent a groove that retains a lip seal near the second end of the cylindrical body while an annular axial projection that extends from the first end of the cylindrical body retains a resilient sealing ring. A resilient ring is located on the annular axial projection while a radial projection that extends from the first end of the cylindrical body forms a surface for holding one end of the poppet spring engages a tubular body of the retainer concentrically locates the axial bore of the cylindrical body with respect to a seat of passage through which fluid is communicated from a reservoir. A shaft with a head on a first end and threads on a second end extends through the axial bore of the cylindrical member with the lip seal engaging the shaft. When the threads are mated with corresponding threads in the piston, the head is urged toward the annular shoulder and the return spring is caged between the retainer and piston to define limits for a chamber while at the same time the poppet spring is caged between the radial projection on the cylindrical body and the retainer. The piston on receiving an input force responds by moving to compresses the return spring such that the piston and shaft move together with respect to the retainer to permit the poppet spring to move resilient ring on the cylindrical body into contact with the seat surrounding the passage connected to the reservoir to interrupt fluid communication from the reservoir. With subsequently movement of the piston fluid in the chamber is pressurized and communicated to wheel brakes to effect a brake application. Since the shaft moves with the piston during the development of the pressurized fluid once the poppet spring has seated the resilient ring on the seat surrounding the passage, the head moves away from the shoulder and within the axial bore of the cylindrical member and should a maximum pressurization of fluid occur in the chamber through the movement of the piston may actually move into the passage without adversely effecting movement of the piston.

An advantage of this brake system is provided by permitting a head on a stem that cages a return spring to slide within a cylindrical member of a poppet of a compensation valve that controls communication between a reservoir and the bore of a master cylinder during the development of pressurizing fluid.

A further advantage of this invention is provided by caging a return spring between a retainer-poppet assembly and a piston wherein a head on a shaft is urged against a stop in a cylindrical member of the retainer-poppet when threads on the shaft are mated with corresponding threads in the piston and allowing the head to move within an axial bore of the cylindrical member when a face on the cylindrical member is seated by a poppet spring during pressurization of fluid to effect a brake application.

A still further advantage of the present invention resided in the reduction in space within a master cylinder where air may be trapped to assure that a system is completely filled fluid.

DETAIL DESCRIPTION OF THE INVENTION

Throughout the specification a similar component will be identified by a number in a first instance and the number plus' in a second instance.

Figure 1:
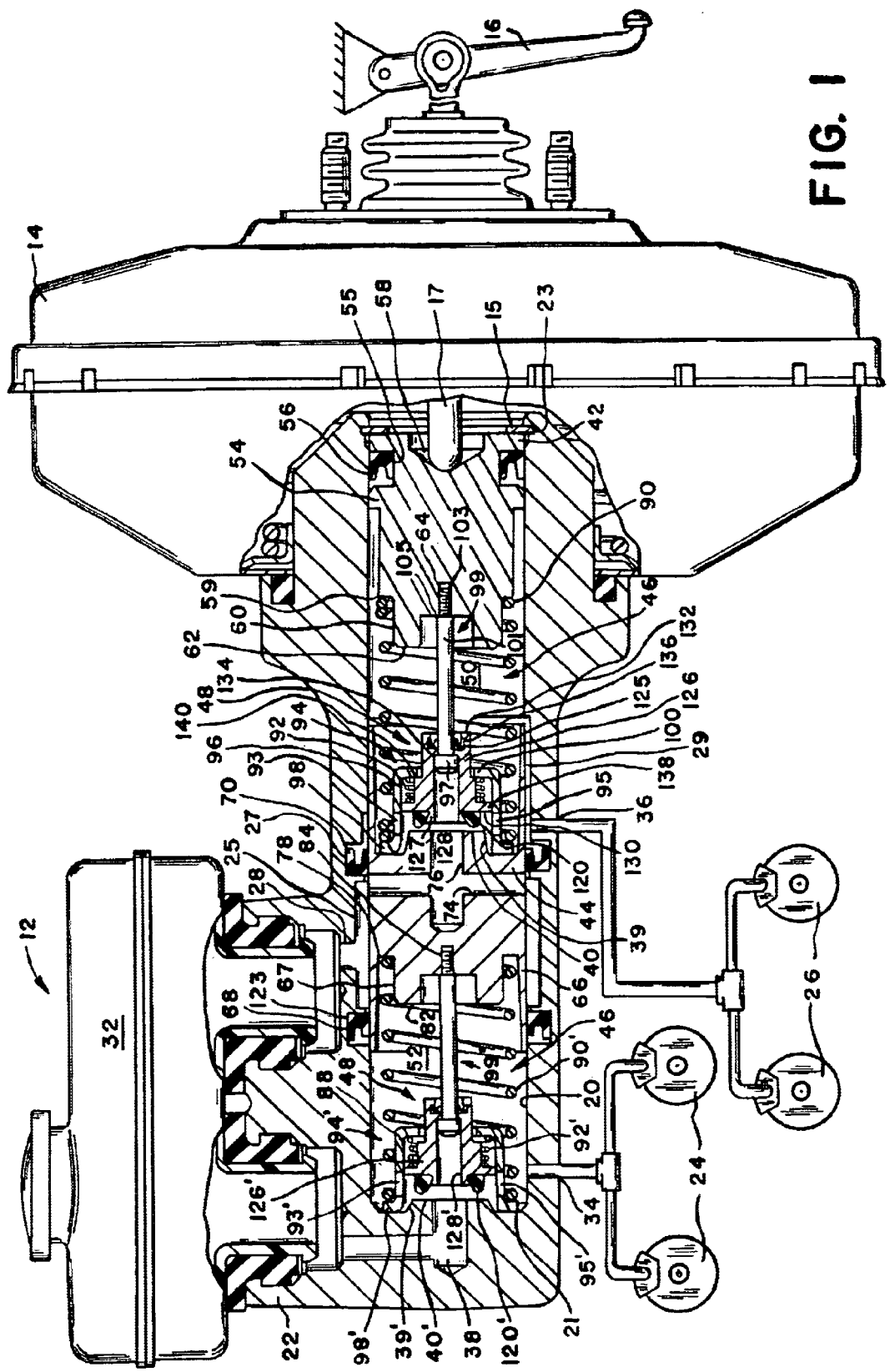
FIG. 1 is a sectional view of a master cylinder for a brake system having center port compensation valves wherein first and second resilient means are caged in according to the present invention.

The master cylinder 12 illustrated in FIG. 1 is of a type disclosed in U.S. Pat. No. 5,943,863 and is designed to activate by a brake booster. The brake booster 14 receives an input force applied by an operator to a brake pedal 16 by an operator and to develop an actuation force that moves first 42 and second 44 pistons located in a bore 20 of the housing 22 of the master cylinder 12 to pressurize fluid that is provided to front and rear wheel brakes to effect a brake application.

In more detail, bore 20 in housing 22 of master cylinder 12 is connected to a reservoir 32 through an axial port 38 located in the bottom 21 of the bore 20 and through the second piston 44 by way of axial passage or port 76, cross bore 74 and compensation groove 25 and radial port 28 in housing 22. Bore 20 is further connected by outlet port 34 to the front wheel brake and by outlet port 36 to the rear wheel brakes. Axial port 38 has a raised orifice 39 with a face that provides a seat 40 for a poppet 88 of a center port compensation valve 48 while a face on orifice 39' located on a rear end of the second piston 44 provides a seat 40' for a center port compensation valve 48'. Bore 20 is further defined by a first seal retention groove 23 located adjacent compensation groove 25 and a second seal retention groove 27 located between the compensation groove 25 connected to compensation port 28 of reservoir 32 and a first supply groove 29 that is connected to outlet port 36 for the rear brakes. The first 42 and second 44 pistons are positioned in bore 20 by resilient means 46,46' to define a first chamber 50 which is connected to outlet port 36 and a second chamber 52 which is connected to outlet port 34.

The first piston 42 has a cylindrical body 54 with a groove 55 that carries lip seal 56 that engages bore 20 to a chamber 50 from the surrounding environment, an axial depression 58 for receiving head on output push rod 17 from a vacuum brake booster 14, a shoulder 59 that is located adjacent a axial guide surface 60 which extends from a front face 62 and a threaded hole 64 that extends from the front face 62 along a center line toward the axial depression 58.

The second piston 44 has a cylindrical body 66 that engages a first lip seal 68 located in groove 23 and a second lip seal 70 located in groove 27 to seal compensation groove 25 from chambers 50 and 52 and assure that compensation groove 25 is only connected to chamber 50 by a cross bore 74 and axial passage or port 76 within the cylindrical body 66. Annular projection 39' on the rear of the cylindrical body 66 surrounds axial passage or port 76 to define seat 40' for a center port compensation valve 48'. The cylindrical body 66 has shoulder 78 that is located adjacent a guide surface 67 that extends from front face 82 while a threaded hole 84 extends from the front face 82 along a center line toward the axial passage 76. The axial passage 76 has a diameter sufficient to receive a head 97 on a shaft 101 of stem member 99 that cages both a return spring 90 and a poppet spring 92 of a first resilient means 46'.

The first resilient means 46' is located in bore 20 between the first 42 and second 44 pistons to define the limits for the first chamber 50 while the second resilient means 46' is located between the bottom 21 of bore 20 and the second piston 44 to define the limits for the second chamber 52. The length of the first 46 and second 46' resilient means and a cylindrical body 66 of the second piston 44 is such that cross bore 74 is aligned with compensation groove 25 in housing bore 74 and as a result cross bore 74 and axial passage are always connected with reservoir 32.

Since the first 46 and second 46' resilient means are identical in structure and functional operation, only the structural components in the second resilient means 46' will hereinafter be described in detail.

The first resilient means 46' is illustrated in FIG. 1 in bore 20 and is defined by a first return spring 90 and a first poppet spring 92. The first return spring 90 is caged between a first retainer 94 and piston 42 while the first poppet spring 92 is caged between the first retainer 94 and a cylindrical member 126 of the center port compensation valve 48'. Retainer 94 has a tubular body 96 with an external lip 98 on a first end and an internal lip 100 on a second end. A cylindrical member 126 which functions as a poppet for the center port compensation valve 48 is concentrically located within the tubular body 96. The cylindrical member 126 is characterized by a axial bore 128 that extends from a first end 130 to a second end 132, a stop or shoulder 134 that is located within the axial bore 128 between first end 130 and the second end 132, a groove 136 that is located in the axial bore 128 between stop 134 and the second end 132 for retaining a lip seal 125, an annular axial projection 127 that extends from the first end 130 for retaining a resilient ring 120, a radial projection 138 that extends from the first end 130 and a shoulder 140 that is located between the radial projection 138 and second end 132. The first poppet spring 92 is located on the peripheral surface of the cylindrical member 126 between the radial projection 138 and the second end 132. The caging of the first return spring 90 and the first poppet spring 92 is achieved by joining a stem member 99 with piston 42. The stem member 99 is defined by a shaft 101 with a head 97 on a first end and a threaded surface 103 on a second end, the threaded end extends to a shoulder 105 to define a desired distance between the shoulder 105 and head 97 to establish a desired size for chamber 50, such that the size may be changed by having a longer or shorter effect length for shaft 101. The head 97 of stem member 98 is located in axial bore 128 with lip seal 125 engaging shaft 101 to seal the axial bore 128 from chamber 50. The head 97 is moved toward shoulder 134 as threaded surface 103 is mated with threads 64 in piston 42 to cage the first return spring 90 between external lip 98 on retainer 94 and shoulder 59 on piston 42 and to cage the first poppet spring 92 between radial projection 138 on cylindrical member 126 and internal lip 100.

Method of Assembly

The resilient means 46' is connected to piston 42 in a following manner. A poppet spring 92 is placed on the peripheral surface of the cylindrical member 126 with one end thereof engaging radial projection 138 and the other end extending toward the second end 132. The cylindrical member 126 is concentrically placed inside of the tubular body 96 of retainer 94 with the poppet spring 92 now being located between the radial projection 138 and the internal lip 100 of the retainer 94. The shaft 101 of a stem member 99 is placed in axial bore 128 and the threaded end 103 passed through lip seal 125 such that the lip seal 125 now sealingly engages shaft 101. A return spring 90 is placed on retainer 94 such that a first end engages external lip 98 and a second end engages shoulder 59 on piston 42. A compressive force is applied to retainer 94 and piston 42 such that the return spring 90 is compressed while a rotative force is applied to head 97 to screw the threaded end 103 of shaft into threads 64 on piston 42. The rotative force continues until shoulder 105 engages face 62 at which time a desired length is established between head 97 and piston 42 and ultimately the size of chamber 50. When the force applied to compress the return spring 90 is released, return spring 90 expands such the internal lip 100 engages shoulder 140 and poppet spring 92 acts on radial projection 138 to move shoulder 134 into engagement with head 97 on stem member 99 to complete the caging of both the return spring 90 and poppet spring 92.

A similar attachment process is achieved with respect to the resilient means 46' and the second piston 44 such that a second return spring 90' and a second poppet spring 92' are caged by stem member 99' such that the functional relationship of retainer 94', cylindrical member 126' and second piston 44 is achieved to define the size of the second chamber 52.

The second piston 44 with resilient means 46 attached thereto is inserted into bore 22 of housing 22 such that lip 98' engages the bottom 21 of bore 20 and surrounding annular projection 39 to align axial bore 128' with passage 38 in housing 22. The peripheral surface on piston 44 engages lip seals 68 and 70 to define chamber 52 such that outlet port 34 is isolated from compensation groove 25 and cross bore 74 is in communication with compensation groove 25. The first piston 42 with resilient means 46' attached thereto is inserted into bore 20 of housing 22 and lip 98 brought into engagement with the rear face of the second piston 44 such that the external lip 98 surrounds annular projection 39' and axial bore 128 is aligned with passage 76 in the second piston 44 while lip seal 56 engages bore 20 to seal chamber 50 from the surrounding environment. A force is applied to piston 42 to compress the first 90 and second 90' return springs and a snap ring 15 is inserted into groove 23 to provide a stop and fix first piston 42 within bore 20. Thereafter, the master cylinder 12 is attached to brake booster 14 such that a head on push rod 17 is located in indentation on piston 42.

The brake booster 14 with master cylinder 12 attached thereto is installed in a vehicle and brake lines for front wheel brakes 24 are attached to outlet port 34 and brake lines for a rear wheel brakes 26 are attached to outlet port 36. As illustrated in FIG. 1, fluid from reservoir 32 is supplied to the front and rear brake systems and air is bled from the brake systems. The caging arrangement of master cylinder 12 reduces the the likelihood of air being retained in the system as the component parts do not have surface where air may be retained or trapped.

Mode of Operation

In the rest position illustrated in FIG. 1, fluid from reservoir 32 is freely communicated to chamber 52 by way of axial port 38 while fluid is communicated to chamber 50 by way of radial port 28, compensation groove 25, cross bore 74 and axial passage or port 76. Fluid freely flows between reservoir 32 and to chambers 50 and 52 in bore 20 through holes 93,95;93'95' in the tubular body 96,96' of retainers 94,94'. With radial port 28 located at approximately the mid-point of housing 22 and since communication of fluid from the reservoir 32 to chamber 50 occurs through the second piston 46, the housing 22 of the master cylinder 12 could be inserted into a front chamber of a vacuum booster to create a compact unitary structure.

Figure 2:
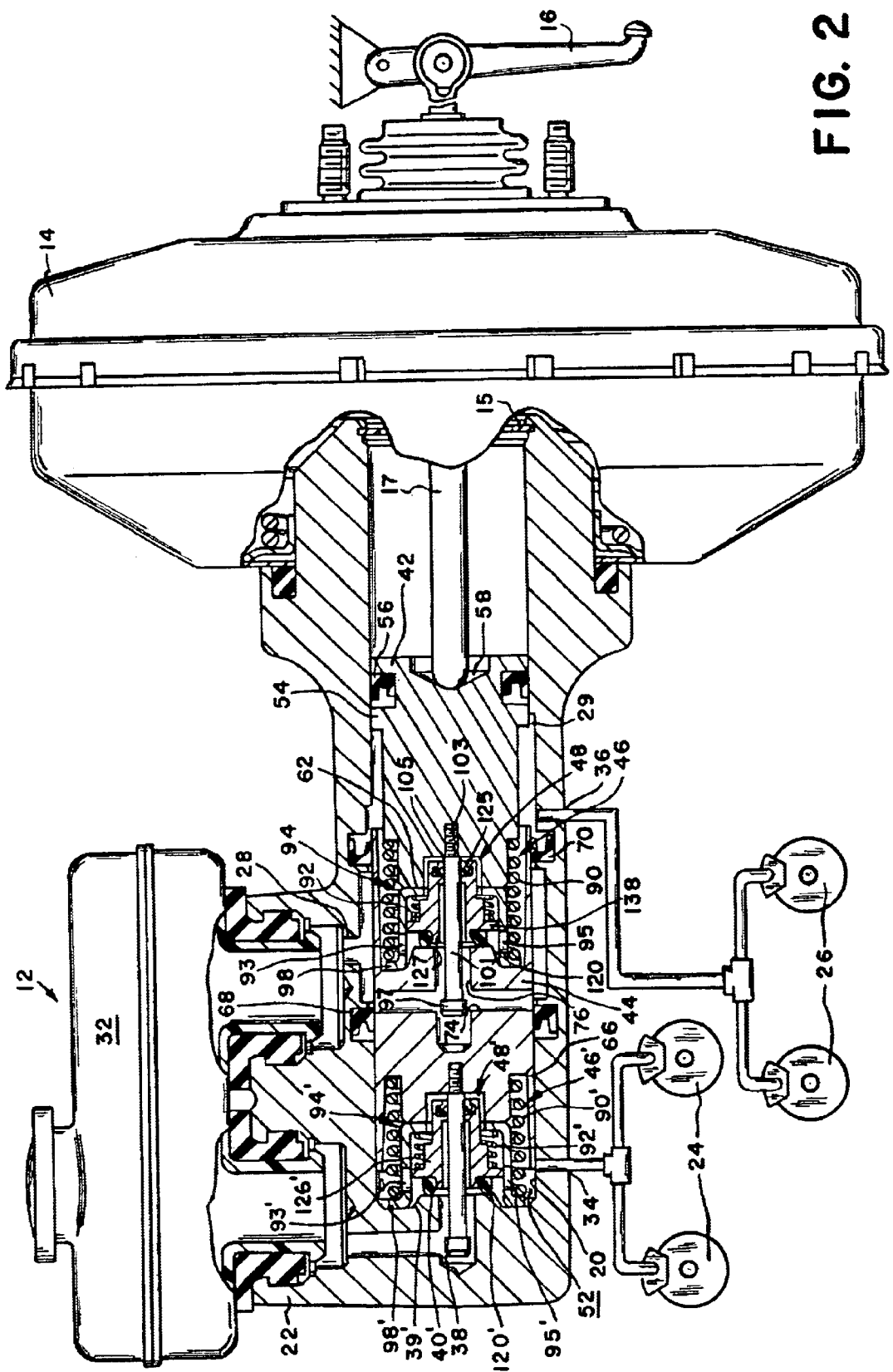
FIG. 2 is a sectional view of the master cylinder of FIG. 1 illustrating a relationship between the components during a brake application.

Once a master cylinder 12 is attached to booster 14 are installed in a vehicle and air removed from the brake systems, a brake application can be effected in the following manner. An input force is applied to a brake pedal by an operator activate the brake booster and create an operational force that is communicated through push rod 17 to pressurize fluid in the master cylinder. Initially, the operational force acts on piston 42 to simultaneously move pistons 42 and 44 and compress return springs 90,90' and allow springs 92,92' to respectively move cylindrical bodies 126',126 such that resilient rings 120',120 into engagement with faces or seats 40,40' to seal chambers 52 and 50. With ports 76 and 38 sealed further movement of pistons 42,44 will pressurize fluid in chambers 50,52 and this pressurized fluid is communicated through ports 34 and 36 to effect a corresponding brake application as illustrated in FIG. 2.

In more particular detail, when chambers 50 and 52 are sealed, the input force acting on piston 42 moves the first 42 and second 44 pistons and stems 101,101' fixed thereto such that heads 97,97' move away from shoulders 134,134' in axial bores 128,128' as the cylindrical members 126,126' are held stationary with respect to the faces or seats 40,40'. As the return springs 90,90' are further compressed by the input force during the development of pressurization fluid in chambers 50,52, the heads 97,97 move within the axial bores 128,128' and at a maximum compression may actually respectively move into passage 76 and passage 38. This structure of this master cylinder 12 provides for maximum pressurization of fluid in chambers 50,52 by allowing the heads 97,97' on the stem members 99,99' to telescope into bore 76 of the second piston 44 and passage 38 of housing 22 to reduce an overall length of the housing 22 to function in this desired manner.

When the brake application is completed, the operational force from the push rod 17 acting on the first piston 42 ceases and return springs 90,90' expand to move the first 42 and second 44 pistons to the rest position shown in FIG. 1 with reservoir 32 connected to chambers 50,52 to allow any needed fluid to flow into bore 20 and maintain the fluid level in the brake system at capacity.

I claim:

1. A master cylinder (12) for use in a brake system having a housing (22) with a bore (20) therein, first (42) and second (44) pistons located in said bore (20) to define a first chamber (50) and a second chamber (52), said first chamber (50) being connected to a reservoir (32) by way of a passage (76) in said second piston (44) and a first port (28) in said housing (22) with said second chamber (52) being connected to said reservoir (32) by a second port (38) in said housing (22) to receive fluid and maintain a fluid level in said brake system at a desired level, first chamber (50) being connected to front wheel brakes (24) and said second chamber (52) being connected to rear (26) wheel brakes to effect a brake application in response to an input force being applied to said first (42) and second (44) pistons, said fluid communication between said first chamber (50) and said reservoir (32) being controlled by a first center port compensation valve (48') that is characterized by a cylindrical member (126) with an axial bore (128) that extends from a first end (130) to a second end (132), said axial bore (128) having an annular shoulder (134) adjacent a groove (136) that retains a lip seal (125) near said second end (132), said cylindrical body (126) having an annular axial projection (127) that extends from said first end (130) for retaining a resilient ring (120) and an radial projection (138) that extends from said first end (130); a retainer (94) having a tubular body (96) with an external lip (98) on a first end and an internal lip (100) on a second end, said tubular body (96) concentrically receiving said cylindrical member (126); a return spring (90) located between said external lip (98) on said retainer (94) and said first piston (42) and a poppet spring (92) located between said radial projection (138) on said cylindrical member (126) and said internal lip (100) on said retainer (94); and a shaft (101) with a head (97) on a first end and threads (103) on a second end, said shaft (101) extending through said axial bore (128) of said cylindrical member (126) with said lip seal (125) engaging said shaft (101) and said threads (103) mating with corresponding threads (64) in said first piston (42) such that said head (97) is urged toward said annular shoulder (134) of said cylindrical body (126) and said return spring (90) is caged between said retainer (94) and first piston (42) to define limits for said first chamber (50) while said poppet spring (92) is caged between said radial projection (138) and said internal lip (100), said first piston (42) receiving an input force that moves said first piston (42) and compresses said return spring (90) such that said first piston (42) and said shaft (101) to move with respect to said retainer (94) to permit said poppet spring (92) to move said cylindrical body (126) and bring said resilient ring (120) into contact with a seat (40) that surrounds said passage (76) in said second piston (44) to interrupt fluid communication from said reservoir (32) through said passage (76) such that with subsequently movement said piston (42) pressurized fluid in chamber (50) that is communicated to said rear wheel brakes (36) to effect a brake application while said head (97) of said shaft (101) moves within the axial bore (128) of said first cylindrical member (126).

2. The master cylinder (12) as recited in claim 1 wherein said head (97) on said shaft (101) moves into said passage (76) when a maximum pressurization of fluid in said first chamber (50) is achieved by movement of said first piston (42).

3. The master cylinder (12) as recited in claim 2 wherein said fluid communication between said second chamber (52) and said reservoir (32) being controlled by a second (48) center port compensation valve that is characterized by a second cylindrical member (126') with an axial bore (128') that extends from a first end (130') to a second end (132'), said axial bore (128') having an annular shoulder (134') adjacent a groove (136') that retains a lip seal (125') near said second end (132'), said second cylindrical member (126') having an annular axial projection (127') that extends from said first end (130') for retaining a resilient ring (120') and an radial projection (138') that extends from said first end (130'); a retainer (94') having a tubular body (96') with an external lip (98') on a first end and an internal lip (100') on a second end, said tubular body (96') concentrically receiving said second cylindrical member (126'); a return spring (90') located between said external lip (98') and said second piston (44) and a poppet spring (92') located between said radial projection (138') of said second cylindrical member (126') and said internal lip (100') of said retainer (94'); and a shaft (101') with a head (97/) on a first end and threads (103') on a second end, said shaft (101/) extending through said axial bore (128') of said second cylindrical member (126') with said lip seal (125') engaging said shaft (101') and said threads (103') engaging said second piston (44) such that said head (97') is urged toward said annular shoulder (124') of said second cylindrical body (126') and said return spring (90') is caged between said retainer (94') and second piston (44) to define limits for said second chamber (52) when said retainer (94') is located in said bore (20) while said poppet spring (92') is caged between said radial projection (138') and said internal lip (100'), said return spring (90') on being compressed by movement of said second piston (44) in response to said input force being applied to said second piston (44) such that said second piston (44) and said shaft (101/) move with respect to said retainer (94') and permit said poppet spring (92') to move said second cylindrical body (126') and bring said resilient ring (120') into contact with a seat (40) that surrounds said port (38) in said housing to interrupt fluid communication from second chamber (52) to said reservoir (32), second piston (44) on continued movement pressurizing fluid in said second chamber (52) that is communicated to said front wheel brakes (26) to effect a brake application while said head (97') of said shaft (101') continues to move within said axial bore (128') of said second cylindrical member (126').

4. The master cylinder (12) as recited in claim 3 wherein said head (97') on said shaft (101') moves into said port (38) when a maximum pressurization of fluid in said second chamber (52) is achieved by movement of said second piston (44).

5. The master cylinder as recited in claim 3 wherein said lip seal (125') retained by cylindrical member (126') of said center port compensation valve (48) engages said shaft (101') to prevent fluid communication from said second chamber (52) to said reservoir (32) during the development of pressurized fluid in said second chamber (32).

6. The master cylinder as recited in claim 2 wherein said lip seal (125) retained by said first cylindrical member (126) of said center port compensation valve (48') engages said shaft (101) to prevent fluid communication from said first chamber (50) to said reservoir (32) during the development of pressurized fluid in said first chamber (50).

7. A master cylinder for use in a brake system, said master cylinder comprising:

a housing with a bore therein connected by a radial port and an axial port with a reservoir and through first and second outlet ports to said brake system;

a first piston located in said bore;

a second piston located in said bore;

first resilient means located in said bore between said first and second pistons to define a first chamber, said first resilient means having a first return spring and a first poppet spring, said first return spring being caged between a first retainer-poppet arrangement and said first piston by a first stem member, said first stem member being sealingly retained in a first axial bore in a first cylindrical member of said first retainer-poppet arrangement having a head that is urged toward a first shoulder in said first axial bore when a threaded end of said first stem member is fixed to said first piston to cage said first return spring between said first retainer-poppet member and said first piston and to cage said first poppet spring a first cylindrical member and a first tubular body of said first retainer-poppet member, said first chamber being connected to said reservoir through an axial passage in said second piston and first port in said housing; and second resilient means located in said bore between said second piston and a bottom of said bore to define a second chamber, said second resilient means having a second return spring and a second poppet spring, said second return spring being caged between a second retainer-poppet arrangement and said second piston by a second stem member, said second stem member being sealingly retained in a second axial bore in a said second cylindrical member of said second retainer-poppet arrangement having a head that is urged toward a first shoulder in said second axial bore when a threaded end of said second stem member is fixed to said second piston to cage said second return spring between said second retainer-poppet member and said second piston and to cage said second poppet spring between a second cylindrical member and second tubular body of said second retainer-poppet member said second return spring being caged between a second retainer-poppet arrangement and second piston by a second stem member, said second chamber being connected to said reservoir through said axial port in said housing; said first and second pistons responding to an input force by initially moving within said bore to compress said first and second return springs of said first and second resilient means and allow said first and second poppet springs to urge a face on said first and second cylindrical members into respective engagement with said axial passage of said second piston and said axial port of said housing to terminate communication between said bore and said reservoir and thereafter continue to respectively move to pressurize fluid in said first and second chambers that is communicated to said brake system through said first and second outlet ports to effect a brake application, said first and second retainer-poppet members being characterized by a first lip seal that is retained in said first axial bore of said first cylindrical member and engages said first stem member and a second lip seal retained in said second axial bore of said second cylindrical member and engages said second stem member the respectively seal said first and second axial bores from receiving pressurized fluid from said first and second chambers while allowing said first and second stems to moves within said first and second axial bores during movement of said first and second pistons in the development of pressurized fluid.

8. The master cylinder as recited in claim 7 wherein each of said first and second stems member is characterized by a stop that respectively engages said first piston and said second piston to fix a first distance between said first shoulder and said first piston and a second distance between said second shoulder and said second piston, said first and second distances respectively defining a size for said first chamber and said second chamber.

9. A poppet for a center port compensation valve carried by a piston in a master cylinder to control communication between a bore of a housing and a reservoir, said compensation valve having a first spring caged between a retainer and said piston to define limits for a chamber within said bore, a cylindrical member concentrically located within said retainer having an axial bore therein that extends from a first end to a second end with a stop located within said axial bore between said first end and said second end and a groove located between said stop and said second end; a poppet spring located between a projection on said cylindrical member and said retainer, a stem member located in said axial bore having a shaft that extends through said lip seal with threads thereon that mate with corresponding threads in said piston such that a head on said stem is urged toward said stop by said return spring, said cylindrical member having a face thereon that is urged toward a seat surrounding a passage to a reservoir through which fluid is communicated to said chamber by said poppet spring on movement of said piston by an operational force that compresses said return spring to allow development of pressurized fluid in said chamber that is communicated to a brake system to effect a corresponding brake application, said poppet being characterized in that lip seal seals said chamber to prevent communication of pressurized fluid to the axial bore of said cylindrical member during movement of said piston to pressurize fluid in said chamber while allowing said head on said stem to freely move within said axial bore.

* * * * *